United States Patent
Doctoroff et al.

[15] 3,645,600
[45] Feb. 29, 1972

[54] HEAT ABSORBING REFLECTOR UTILIZING A METALLIC SUBSTRATE

[72] Inventors: Michael Doctoroff, Rochester; Bernt D. Hoppert, Dansville; Steven H. Leece, Rochester, all of N.Y.

[73] Assignee: Bausch & Lomb Incorporated, Rochester, N.Y.

[22] Filed: Nov. 3, 1970

[21] Appl. No.: 86,463

[52] U.S. Cl. ............................. 350/1, 117/33.3, 350/290
[51] Int. Cl. ....................................................... G02b 5/26
[58] Field of Search ................. 350/1, 163, 164, 166, 290; 117/33.3; 240/41.35 R, 41.35 C, 46.49 R, 46.49 A, 47, 103; 313/112–116

[56] References Cited

UNITED STATES PATENTS 2,852,980  9/1958  Schroder ............................. 350/1
2,914,989  12/1959  Gretener ............................. 350/1

Primary Examiner—David Schonberg
Assistant Examiner—Ronald J. Stern
Attorney—Frank C. Parker and Bernard D. Bogdon

[57] ABSTRACT

A reflector, for reflecting generally all wavelengths of radiation of visible light from a multilayer interference reflecting coating for generally concentrated projection of the visible light and for absorbing substantially all wavelengths of radiation of heat, is provided for by a metallic substrate having formed thereon, between it and the multilayer interference reflecting coating, an antireflection coating having a continuously graded refractive index for transmission therethrough of wavelengths of heat radiation for absorption into the metallic substrate.

6 Claims, 2 Drawing Figures

MICHAEL DOCTOROFF
BERNT D. HOPPERT
STEVEN H. LEECE
INVENTORS

BY

BERNARD D. BOGDON

ATTORNEY

HEAT ABSORBING REFLECTOR UTILIZING A METALLIC SUBSTRATE

BACKGROUND OF THE INVENTION

1. Field of the Invention

The present invention is related to a reflector of visible light, and in particular to a reflector for specularly reflecting visible light and for absorbing heat.

2. Brief Description of the Prior Art

It is generally desirable to make reflectors for light sources for projection purposes from metallic substrates. Materials such as aluminum are easily formed to provide generally most desirable reflector configurations and aesthetic designs. Reflectors from such lightweight materials as aluminum are easily handled both in manufacturing and installation and do not require elaborate support structures. However, one noticeable shortcoming of metallic reflectors, including aluminum, is that the metal acts not only to reflect visible light at a high efficiency, but also to reflect electromagnetic radiation of wavelengths in the heat or generally infrared range.

Accordingly, to overcome this major deficiency of metallic reflectors, glass substrates were adopted. Properly coated, glass has the property of satisfactorily reflecting the visible light and transmitting the infrared radiation therethrough to thereby focus the visible light generally devoid of the presence of heat. However, glass, as is well known, is fragile and accordingly, must be of relatively greater thickness at the base for strength purposes which adds considerably more weight to each illuminator.

A relatively inexpensive reflector of a metallic substrate which focuses reflected visible light at a great efficiency, and which, either effectively absorbs and/or selectively reflects wavelengths of radiation of heat to maintain the temperature of the reflector at a reasonable level and to preclude heat from being focused along with the visible light is a needed and would be a notable contribution to the art.

An invention by E. Gretener disclosed in U.S. Pat. No. 2,914,198 comprises a reflector including a reflecting coating, a metallic support and an absorbing layer in between the coating and the support wherein the coating reflects visible light but transmits invisible radiation and wherein the absorbing layer practically fully absorbs all radiation within the range transmitted by the coating. In effect, the absorbing layer acts to absorb and the metallic support acts to receive heat from the absorbing layer to disperse heat through conduction. The Gretener invention was designed primarily for use as a reflector in an arc lamp. Such a reflector is suitable for certain applications and overcomes some of the deficiencies of the prior art, but operates at a limited efficiency because of the inherent heat transfer limitations of the absorbing material forming the boundary between the absorbing layer and the metallic support.

SUMMARY OF THE INVENTION

Applicants herein provide the description of an invention to likewise overcome major deficiencies of prior art reflectors having a metallic substrates, and to provide a reflector having a metallic substrate for directly absorbing heat radiation transmitted thereto and to thereby dissipate the heat at a greater efficiency than metallic reflectors included in the prior art. A reflector comprising a sandwiched combination of a metallic substrate, antireflection coating and a multilayer interference reflecting coating is provided for by applicants, for generally reflecting all wavelengths of radiation of visible light with a multilayer interference reflecting coating and for generally or selectively transmitting through the reflecting coating and the antireflection coating all wavelengths of radiation of heat to be absorbed and dispersed by a metallic substrate having generally high thermal conductivity.

DETAILED DESCRIPTION OF THE PREFERRED EMBODIMENT

Figure 1:
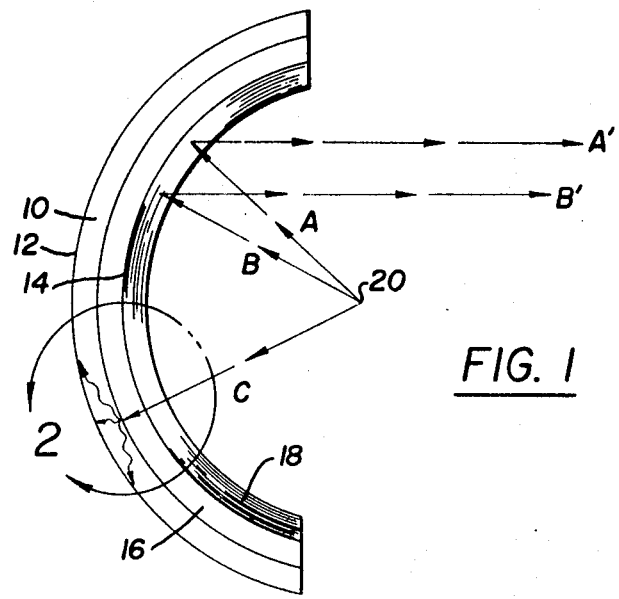
FIG. 1 is a schematic exemplary illustration of an embodiment according to the principles of the present invention.

In FIG. 1, a metallic substrate 10 formed, for example, of aluminum or aluminum alloy material is provided as a main support of a reflector. It is generally desirable that the material selected for the metallic substrate 10 be highly ductile, as is aluminum, for manufacturing, relatively inexpensively, for example, by stamping or other methods of cold forming, most any desirable reflector design configuration for good appearance and lighting efficiency.

The exemplary embodiment of FIG. 1 is of circular configuration. It will be appreciated, however, that a myriad of other configurations may be employed according to the principles of the present invention, depending only upon the particular application for the proposed reflector. Since a reflector, according to the principles of the present invention, absorbs heat radiation waves, the metallic substrate 10 is preferably of suitable thickness for absorbing heat without distorting. For example, when a reflector is of parabolic shape and has a diameter of approximately 8 inches across its perimeter, for use with a light source of, for example, a 650 watt bulb of 20,000 lumens for disposition generally at the focal point of the reflector, a thickness of 0.065 inches for the metallic substrate is quite satisfactory. When heat radiation is absorbed by the metallic substrate 10, the heat is readily conducted because of the high thermal conductivity of such materials as aluminum, which for purposes of this invention is a particularly desirable property. The generally rapid conduction of heat, theoretically uniformly heats the metallic substrate 10. The heat conducted to a back surface 12 of the metallic substrate 10 is dissipated from the metallic substrate 10 generally through convection into the surrounding air. The conditions of the ambient air may be controlled if desired, for example, by forcing air across the back surface 12 of the metallic substrate 10 to cause more rapid heat dispersion in the metallic substrate 10 through convection at the back surface 12. For purposes of this invention, heat is generally defined as the electromagnetic radiation in the wavelength range beyond 0.7 microns.

Figure 2:
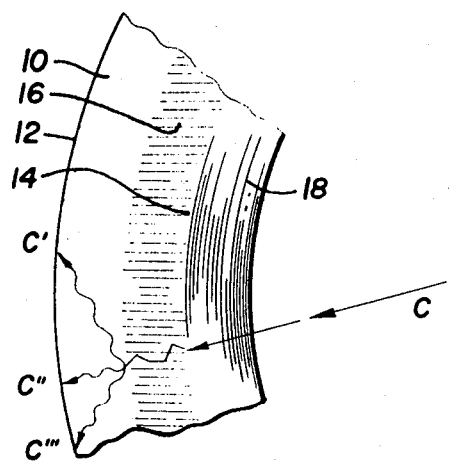
FIG. 2 is a partial enlarged schematic illustration of the portion of the embodiment shown within the circular section 2 of FIG. 1.

The metallic substrate 10 is provided with a front surface 14 generally polished to be optically smooth for forming an antireflection coating 16. The antireflection coating 16 is formed as a continuously graded refractive index for readily transmitting therethrough heat radiation for absorption into the metallic substrate 10. Electromagnetic radiation wavelengths are transmitted through the antireflection coating 1 according to Snell's Law, as generally illustrated in FIG. 2.

An antireflection coating can be formed by many processes well known in the art. For example, the coating may be formed by baking or anodizing the surface 14 or vacuum coating the surface 14 of the metallic substrate 10 to thereby provide a relatively thick antireflection coating 16. The illustrated embodiment of FIG. 1, schematically illustrates the antireflection coating being formed by anodizing or baking. In practice, the thickness is controlled by the intrinsic nature of the buildup, for abnormally thick buildups tend to deteriorate, crumble or break off to form irregular surfaces which when operated provide nonuniform results.

The function and theory of antireflection coatings, as applied to this invention, is discussed in detail on inclusive pages 239–304 in an article entitled "Antireflection Coatings for Optical and Infrared optical Materials" by J. Thomas Cox and Georg Hass included in the publication of *Physics Of Thin Films*, Volume 2, edited by G. Hass and R. E. Thun and published and copyrighted by Academic Press Incorporated in 1964.

A treatise, *The Finishing Of Aluminum*, edited by G. H. Kissin, published by Reinhold Publishing and copyrighted in 1963, useful in practicing the herein described invention, includes commentary in Chapter 2 entitled "Anodizing Characteristics of Commercial Aluminum Alloys in Sulfuric Acid" by authors G. H. Kissin, P. E. Deal and A. V. Paulson. In addition, the eighth edition of *Metals Handbook*, Volume 2 entitled "Heat Treating, Cleaning and Finishing," prepared under the direction of the ASM Handbook Committee and copyrighted in 1964, particularly at pages 620–627, teaches procedures for anodizing which are useful in forming the antireflection coating of this invention.

Unlike prior art devices, such as the one described in the hereinbefore mentioned Gretener patent, the intermediate layer herein described comprising the antireflection coating 16 is introduced for its transmitting properties and it is neither intended nor desirable that the intermediate layer absorb heat radiation.

The antireflection coating 16 is the middle portion of a three layer sandwiched combination comprising the metallic substrate 10, the antireflection coating 16 and interference layers 18 applied immediately over the antireflection coating 16. Uniform reflection of the generally visible light identified generally by wavelengths in the range of 0.4 through 0.7 microns is provided for by any well-known dielectric stack. Reflecting coatings for use in the present invention are well known. A particularly treatise useful in practicing the art involving interference layers is included in an article entitled "Design of Multilayer Interference Filters" by A. Thelen on inclusive pages 47–86 in *Physics Of Thin Films*, Volume 5, edited by G. Hass and E. Thun and published by Academic Press, New York and London, 1969.

By slightly modifying the illustrated embodiment, for example, by adding either on, in or under the interference layers 18 a coating of, for example, germanium, for absorbing a selected range of the heat radiation, the amount of heat traversing through to the metallic substrate can be controlled.

As an example of the reflection of visible light rays there is schematically illustrated in FIG. I, visible light rays A and B emanating from an exemplary point light source 20 and traversing to the interference layers 18, being reflected therefrom in the direction of arrows A' and B', respectively. Other types of light sources such as infinite sources where the light rays travel in a generally parallel pattern are also suitable for use according to the principles of the present invention.

By way of example, heat ray C emanating from the point light source 20 traverses therefrom through the interference layers 18 and into the antireflection coating 16 to be transmitted therethrough according to Snell's Law for absorption by the metallic substrate 10, as schematically illustrated in FIG. 2, by wavy arrows C', C'', C'''.

What is claimed is:

1. A reflector for reflecting generally all wavelengths of radiation for providing visible light, and for absorbing substantially all wavelengths of radiation for providing heat thereby precluding wavelengths of heat radiation from being reflected from the reflector, comprises:
    a metallic substrate having a high thermal conductivity;
    an antireflection coating disposed upon a surface of the metallic substrate, said antireflection coating for transmitting heat in the direction of the metallic substrate and for precluding reflection of heat wavelengths of radiation therefrom; and
    a multilayer interference reflecting coating disposed upon the antireflection coating for reflecting substantially all wavelengths of radiation for providing visible light and for transmitting therethrough to the antireflection coating and to the metallic substrate for absorption, substantially all wavelengths of radiation for providing heat.

2. The reflector as defined in claim 1, wherein the metallic substrate is formed of aluminum.

3. The reflector as defined in claim 1, wherein the antireflection coating disposed upon the surface of the metallic substrate comprises an anodized layer.

4. The reflector as defined in claim 1, wherein the antireflection coating disposed upon the surface of the metallic substrate comprises a baked aluminum layer.

5. The reflector as defined in claim 1, further including:
    a layer deposited proximate the multilayer interference reflecting coating for absorbing a selected range of the heat radiation to thereby control the quantity of heat transmitted therethrough to the metallic substrate.

6. The reflector as defined in claim 5, wherein the last mentioned layer is formed of germanium.

* * * * *